Nov. 25, 1952        O. RAWLINSON        2,619,223

SELF-ALIGNING IDLER ROLLER FOR BELT CONVEYERS

Filed Sept. 6, 1949        3 Sheets-Sheet 1

INVENTOR.
OCIE RAWLINSON
BY
Jennings & Carter
ATTORNEYS

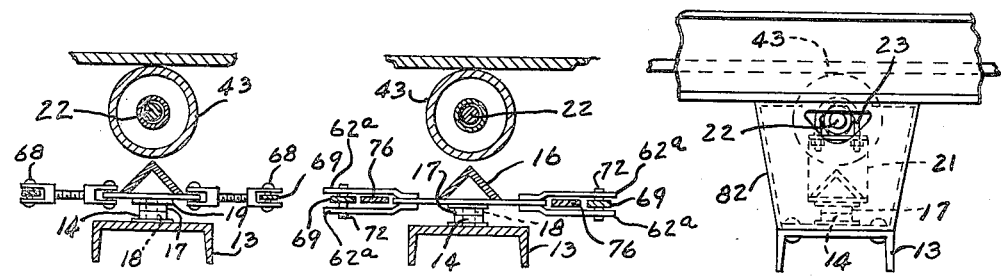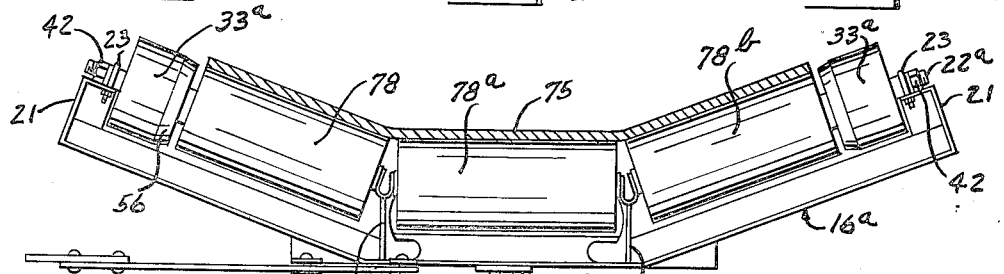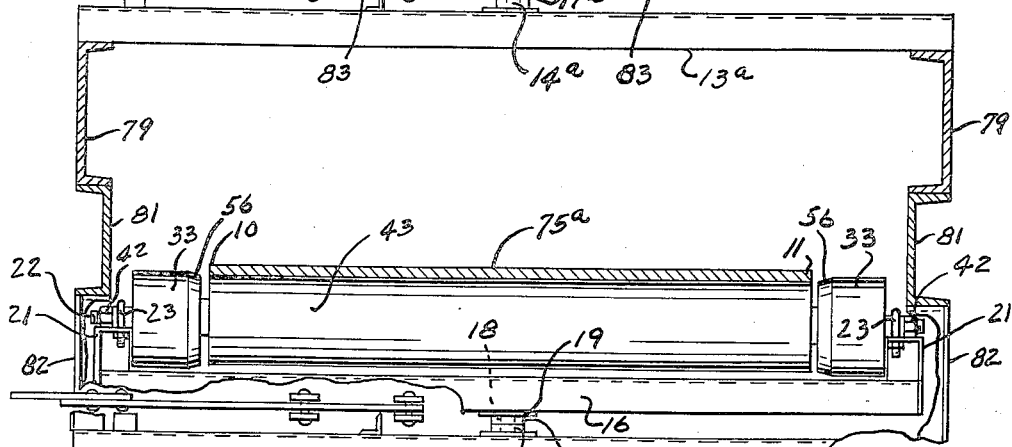

Nov. 25, 1952     O. RAWLINSON     2,619,223
SELF-ALIGNING IDLER ROLLER FOR BELT CONVEYERS

Filed Sept. 6, 1949     3 Sheets-Sheet 3

Inventor
OCIE RAWLINSON

Jennings & Carter
Attorneys

Patented Nov. 25, 1952

2,619,223

UNITED STATES PATENT OFFICE 2,619,223

SELF-ALIGNING IDLER ROLLER FOR BELT CONVEYERS

Ocie Rawlinson, Birmingham, Ala.

Application September 6, 1949, Serial No. 114,242

3 Claims. (Cl. 198—202)

My present invention relates to self-aligning idler rollers for supporting either the load carrying or return flight of a belt conveyor, and has for an object the provision of such apparatus which embodies simple yet effective means for counteracting off-center conditions of the belt without damage to the belt.

My invention contemplates a self-aligning roller or assembly of the same which is mounted in a suitable supporting frame work in turn pivotally mounted for movement diagonally of the center line of the belt, together with auxiliary rollers at the ends of the belt supporting roller or rollers, said auxiliary rollers having greater rolling friction than the supporting rollers, whereby when the belt runs to one side it engages the auxiliary rollers, pivoting the whole assembly diagonally of the center line of the belt, thereby re-centering the belt.

A further object is to provide apparatus of the character designated in which the increased friction of the auxiliary rollers is provided by means of bearings larger in diameter than the bearings in the main belt supporting roller, thus assuring smooth and trouble free operation, and eliminating damage to the edges of the belt as has been the case in some prior art apparatus.

A further object is to associate with one or more such pivoted roller assemblies a spring actuated mechanism operable to bias the assemblies to centered position after the belt runs off the auxiliary rollers in moving back to re-centered position, thus eliminating possible undesirable oscillations of the assembly about its pivot point.

A still further object is to provide the auxiliary rollers in the manner set forth which on several adjacent sets of supporting rollers increase progressively in axial length in the direction of travel of the belt, thus to compound the centering effect of the auxiliary rollers, and to connect the pivoted assemblies together by links, causing a plurality of the same to act in unision in re-centering the belt.

Apparatus illustrating the features of my invention is shown in the accompanying drawings forming a part of this application in which:

Fig. 3 is a detail sectional view taken generally along line III—III of Fig. 1;

Fig. 4 is a detail sectional view taken generally along line IV—IV of Fig. 1;

Fig. 5 is an end elevational view of one of the roll stands shown in Fig. 1;

Figure 1:
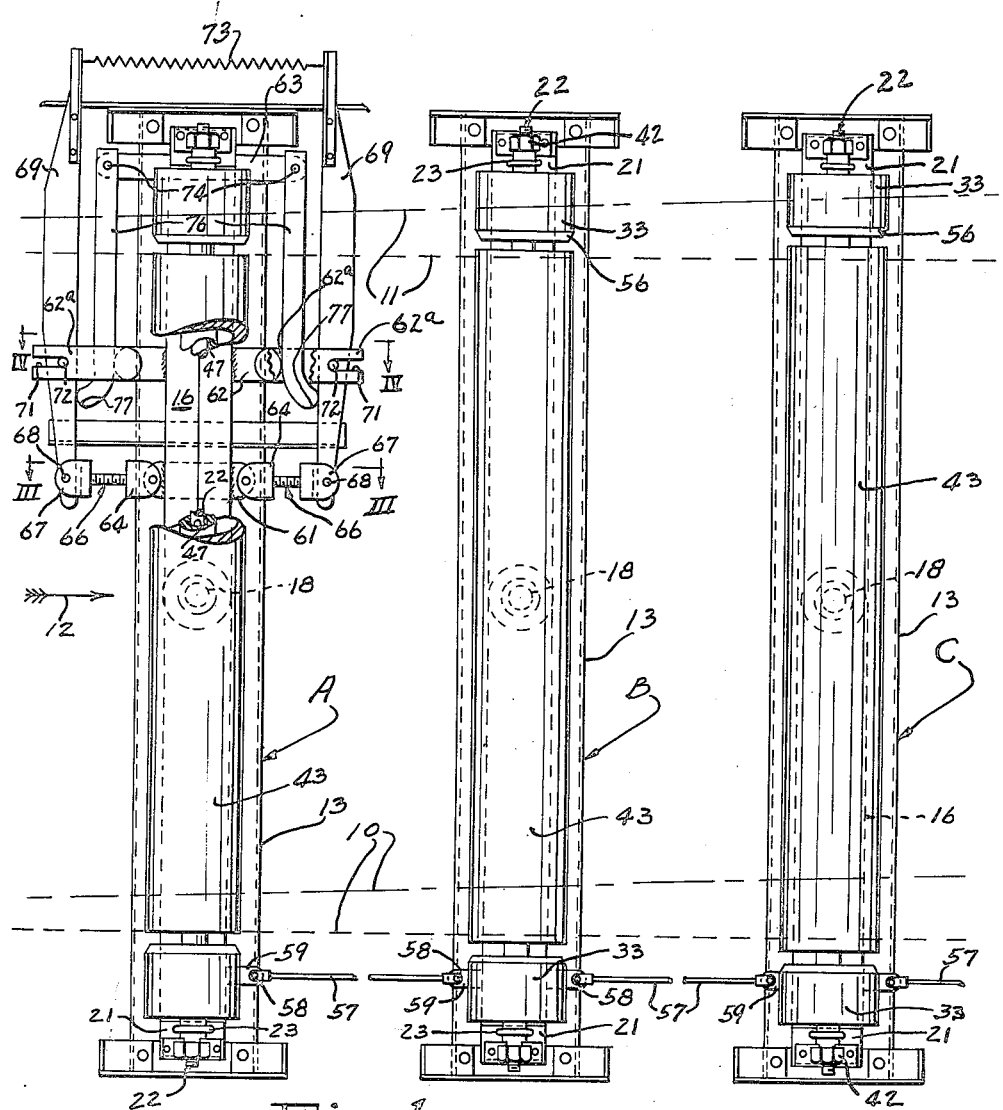
Fig. 1 is a plan view, partly broken away and in section, showing a group of my improved idler roller assemblies which may be used either for the return flight of the belt or as a non-troughing support for the load carrying flight thereof.

Referring now to the drawings for a better understanding of my invention, and more particularly to Figs. 1 to 5 inclusive, I show a series of belt supporting units indicated generally by the letters A, B, and C. The units A, B and C are spaced apart along the belt in the manner well understood, to support the flights of the belt at intervals. In the case illustrated the flight preferably supported by rollers of the type shown in Fig. 1 is the return or non-load carrying flight, although the same may be used to support the loaded flight. The outer edges of the belt are indicated at 10 and 11 in Fig. 1, and the belt is assumed to be moving in the direction of the arrow 12. Except as will be noted each of the units A, B and C are identical, and hence a description of one will suffice for all.

Each of the units A, B and C may comprise a stationary support 13 in the form of an inverted channel. At the longitudinal mid-point of the channel 13 is a boss 14.

Mounted to pivot diagonally of the center line of the belt is a roller supporting frame 16. Adjacent its longitudinal mid-point the frame 16 is provided with a boss 17, adapted to fit with its face flush against the boss 14. A pin 18 secures the two bosses against displacement other than relative pivotal movement. The member 16 preferably is in the form of an inverted angle for reasons of strength, and its boss 17 is secured by welding the same to the underside of a plate 19, in turn welded to the member 16.

On each end of the swingable frame 16 I provide upstanding brackets 21. A cross shaft, indicated generally by the numeral 22, extends continuously across the frame 16 and has its ends secured to the upstanding brackets 21 by means of U-bolts 23. The member 16, end brackets 21 and shaft 22 thus are free to pivot about the pin 18 in a direction diagonal to the center line of the moving belt.

Figure 2:
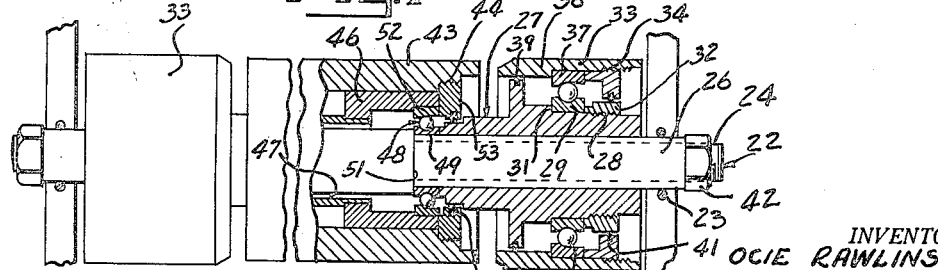
Fig. 2 is a fragmental plan view of a set of the rollers, partly broken away and in section to illustrate the bearings of the main and auxiliary rollers.

As best shown in Fig. 2 the outer end of the shaft 22 is reduced and threaded as indicated at 24. Surrounding the reduced end 24 is a sleeve 26. Pressed on the outer end of the sleeve 26 is an adapter 27 having a threaded section 28 adjacent its outer end. Pressed onto the adapter is the inner race 29 of a ball bearing 30, the inner race being held against the shoulder 31 by means of a nut 32 screwed onto the threaded section 28 of the adapter.

Disposed to rotate about the adapter 27 is a relatively short auxiliary roller 33 in the form of a length of tubing or a casting of the shape shown. Adjacent its outer end is a threaded section 34 and adjacent its inner end is a shoulder 36 against which the outer race 37 of the bearing 30 is adapted to be pressed. Grease seals 39 and 41 may be provided to retain grease in the bearing in the manner understood. The sleeve 26 as well as the adapter 27 pressed thereon are held in place on the end of the shaft 22 by means of a nut 42.

The main belt supporting roller 43 comprises a cylindrical casting or length of tube having an internally threaded section 44 at each end. Pressed into each end of the roller 43 is an adapter 46, the inner ends of the adapter being connected by means of a grease tube 47. The roller 43 is supported for rotation on a bearing 48, the inner race 49 thereof being pressed onto the sleeve 26, and abutting the shoulder 51 formed as a result of reducing the outer end 24 of the shaft 22. The outer race 52 of the bearing 48 may be pressed into the adapter 46, and the parts are held assembled by means of a nut 53. A suitable packing 54 may be used to retain grease within the grease tube 47 and around the bearings 48 at the ends of the roller 43.

As shown in Fig. 2, the effective diameter of the bearings 48 for the main roller 43 is considerably smaller than the effective diameter of the bearings 30 of the end or auxiliary rollers 33. It will at once be apparent that the result of this is to impart to the end rollers 33 greater resistance to rotation than is possessed by the main belt supporting rollers 43. It will be understood that each end of the roller 43 is equipped with a bearing 48 and the associated adapter and nut, and that the roller 33 on the opposite end of the shaft 22 is identical with the one shown in section in Fig. 2. For a reason later to appear I make the roller 33 slightly larger in diameter than the roller 43, and bevel the inner edge thereof as indicated at 56.

From the mechanism already described the principal features of my invention may now be readily explained and understood. Considering Fig. 1, and assuming that there is but one of the units present, say for instance the unit C, the operation of the device is as follows: With the belt moving in the direction of the arrow 12 and centered with respect to the main supporting roller 43 of the unit C, the edges of the belt occupy the positions indicated by the dotted lines 10 and 11. However, let it be assumed that for some reason the belt becomes uncentered, the edges 10 and 11 moving to the positions indicated by the dot-dash lines in Fig. 1. Under these conditions the belt will have moved up onto the auxiliary roller 33 at the end of the main roller toward which the belt has moved, engaging this roller, and causing rotation thereof. As will be remembered, roller 33 has greater resistance to rotation than does the main roller 43. This resistance to rotation causes the entire roll group to pivot on the pin 18 in a direction to follow the movement of the belt, since the roller 33 on which the belt is engaged tends to follow the edge of the belt engaging the same. With the main roller pivoted diagonally the belt moves back toward center position in the manner understood, moving off the roller 33 and wholly back onto the main roller 43. Should the belt become uncentered in the opposite direction the roller 33 on the opposite end from that just described comes into play, causing its adjacent end of the swing frame to move in the direction of travel of the belt, thereby causing the belt to again become centered.

It will be especially noted that no damage is done to the edge of the belt, because the beveled edges 56 readily permit the belt to ride upon the rollers 33. I make the rollers 33 slightly larger in diameter than the roller 43 in order to accentuate the pivoting action about the pin 18 when the belt first engages the roller 33. In view of the fact that the bearings and rollers carried thereby are balanced, my improved apparatus is exceptionally free of vibration and uneven running, hence increasing materially the life of the supporting bearings and the belt.

Referring now to Figs. 1, 3, 4, 6 and 7, I show my improved apparatus having associated therewith an equalizing means which is particularly useful for belts which have an exaggerated tendency to become uncentered. In this instance I place the units A, B and C in normally spaced, belt supporting relation and connect the same together by means of rigid tie rods 57 pivotally secured to each of the frame members 16 as at 58 to an ear 59 carried by the frame member. On one set of such connected rollers, for instance the unit A, I place a spring biased mechanism, later to be described in detail, and which is effective to bias the sets A, B and C toward a position normal to the center line of the belt.

As best shown in Fig. 1 I provide beneath the swing frame member 16 of the unit A a plate 61. Also welded beneath the swing frame member 16, at a point further toward the end thereof from the pivot point 18 a second plate 62. Fixed to the stationary member 13 is a plate 63 extending transversely of the swing frame 16. Each end of the plate 62 is provided with lapped overhanging plates 62a forming in effect a yoke on the ends of the plate 62.

To each projecting end of the cross plate 61 I secure one of the clevis ends 64 of a turn buckle 66. To the opposite clevis end 67 of each turn buckle 66 I pivotally mount by means of a pin 68 one end of an arm 69. The outer projecting ends of the plates 62a are slotted as indicated at 71. I secure to the arms 69 pins 72 which are disposed to fit slidably in the slots 71. The outer ends of the arms 69 are cross connected by a tension spring 73.

Pivotally mounted on the pins 74 to the projecting ends of the plate 63 are a pair of levers 76. The inner ends of the levers 76 are rounded as indicated at 77 and are turned outwardly with respect to the longitudinal center line of the member 16, thus to engage against the inner edges of the respective arms 69. The ends of the cross plate 62 contact the inner edges of the arms 76 when the pivotally mounted roll supporting frame is normal to the longitudinal center line of the belt.

As shown clearly in Fig. 1, when using the centering mechanism and connecting links 57, I preferably make the rollers 43 progressively longer in the direction of travel of the belt, and the rollers 33 progressively shorter in the direction of travel of the belt. Thus, the roller 43 of unit A is substantially equal in length to the width of the belt, while rollers 43 of units B and C are slightly and progressively longer than the width of the belt. Similarly, the rollers 33 of unit A are slightly longer than those of unit B, and those of unit B are slightly longer than those of unit C. The reason for this construction will appear as the operation is described.

Figure 6:
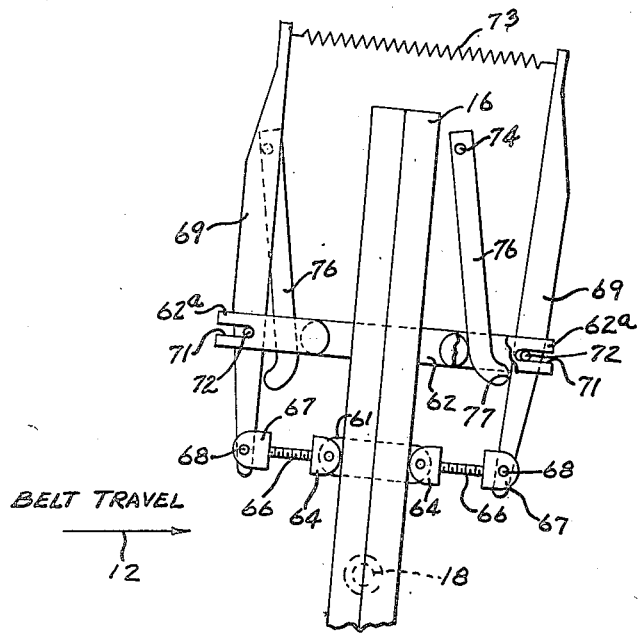
Figs. 6 and 7 are somewhat diagrammatic views illustrating the functioning of my improved spring biased mechanism for urging the pivoted roll supporting assemblies to center position; and, Fig. 8 is a transverse sectional view of a belt conveyor equipped with my improved apparatus, certain parts being broken away for the sake of clarity.
Figure 7:
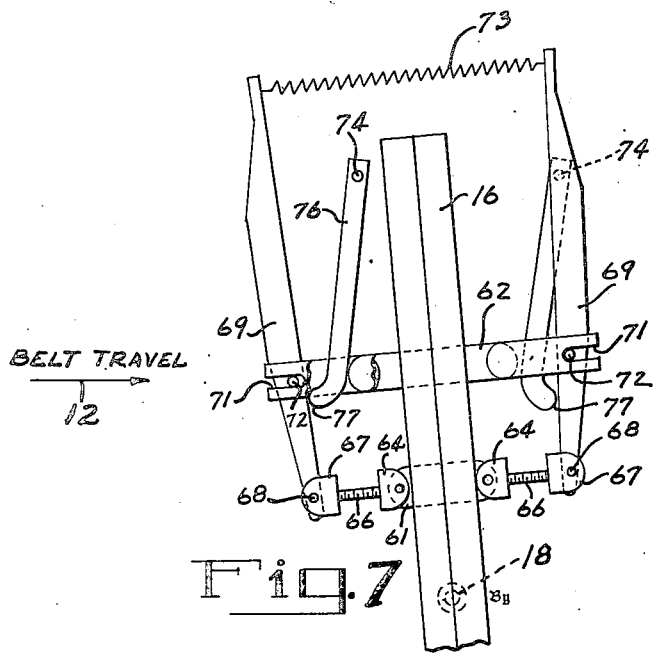

Referring now particularly to Figs 6 and 7 I indicate somewhat diagrammatically the functioning of the centering apparatus. Let it be assumed that the belt is centered on the roller 43 of each of the units A, B and C and is traveling in the direction of arrow 12. Under these conditions the spring 73 biases the longitudinal axis of the swing frames 16 to a position normal to the center line of the belt. The force of the spring is exerted through the arms 69, to pivot points 68 consequently the bottoms of the slots 71. The rounded ends 77 of the arms 76 engage the inner edges of the arms 69, while their inner edges engage the ends of the plates 62, these parts being made so that there is very little pivotal movement of the arms 76 when the belt is centered Let it now be assumed that the belt moves so that its edges 10 and 11 occupy the positions shown by the dot-dash lines in Fig. 1. In this position the several frames 16 carrying the rollers 43 and 33 will each pivot to the position shown in Fig. 6. This causes the inner ends of the arms 76 to move to the right as indicated, and causes the rounded end 77 of the right hand arm 76 as viewed in Fig. 6 to engage the inner edge of the arm 69, moving its corresponding pin 72 out of the bottom of the slot 71 in the associated plates 62a. The spring 73 thus tends to return the swing frames 16 to the left back to centered position due to the difference of the leverage exterted between the points 68 and 77 on the right hand side, Fig. 6, as compared to the force exerted by the spring in pulling the left hand arm 69 to the right. This difference in favor of leftward movement will be understood by considering that the rightward force is less because the effective moment arm of the arm on the left hand side is the distance between its pivot point 68 and its pin 72. The swing frame thus is biased leftward to centered position from the position shown in Fig. 6, and when the same reaches this position it does not tend to override to the left as would be the case were the centering mechanism not used. Further, this system of linkage is superior to the use of two springs secured to the ends of the swing frame 16 for the reason that no balancing of the springs is necessary, the single spring 73 being used to pull the swing frames in both directions.

Referring to Fig. 7, it has been assumed in this position that the belt has become uncentered in the direction opposite that shown in Figs. 1 and 6. From an inspection of this figure it will be seen that the parts assume a position opposite to that in Fig. 6 wherein the spring 73 tends to move the swing frames 16 to the right, back to centered position.

By the use of the centering mechanism shown and the rigid rods or links 57, together with the main and auxiliary rollers of different lengths as shown, I am enabled to compound the off-centering forces of the belt in order to bring the same back to centered position, and to accomplish this with one centering mechanism.

By an inspection of Fig. 1 it will be seen that when the belt first commences to get off-center it contacts the roller 33 of unit A before it contacts the roller 33 of unit B. Likewise, because the rollers 33 of unit C are in turn shorter than those of unit B the belt contacts the roller 33 of unit B before it contacts the roller 33 of unit C. With the units hooked together by the links 57 the difference in length of the rollers 33 causes the belt to commence its movement toward centered position at points along the length thereof removed from the actual off-center point. Thus the overall centering effect is accentuated by moving all of the units in unison since the belt in off-center condition remains engaged for a greater length of time with the longer rollers 33 than would be the case if they were of equal length.

Referring now to Fig. 8 of the drawing I show my improved mechanism associated with both the load carrying flight 75 and return flight 75a of a conveyor belt. In this instance the load carrying flight is shown as supported on troughing rolls 78, 78a and 78b, each of which corresponds to the main belt supporting roller 43. At the outer ends of rollers 78 and 78b, I provide rollers 33a, similar to the roller 33. These rollers are supported on a swing frame 16a, having the boss 17a at the mid point and resting pivotally on the boss 14a carried on the cross frame 13a. The frame 13a may be supported in elevated position above the return flight rollers on superposed channels 79 and 81, resting on channels 82 at the ends of the lower roller frame work. In the manner understood the adjacent ends of rollers 78a—78 and 78a—78b are supported on brackets 83. The outer ends of the shafts passing through the ends of the rollers are supported by U-bolts 23. The rollers 33a are mounted for rotation on a shaft 22a and on bearings similar to those shown in Fig. 2 for the auxiliary rollers 33. Likewise, the rollers 78, 78a and 78b are provided with the bearings 48, and which are smaller in diameter than the bearings supporting the rollers 33. If desired, there may be associated with the upper rollers being described the centering mechanism such as is shown in Fig. 1 and consisting of the leverage system, and a plurality of frames 16a may be connected together by means of the lugs 59 and links 57.

The rolls and supporting framework therefor for supporting the flight 75a of the belt are identical with the ones shown in Fig. 1, and no further description is deemed to be necessary.

From the foregoing it will be apparent that I have devised an improved idler support for belt conveyors which is effective to return an off-centered belt to its correct position. In actual practice I have found that my invention is extremely effective for its intended purpose and that it is far superior to those types of centering mechanisms in which the edges of the belt in off-center position engage rollers, stops or the like to swing the pivotally mounted framework. Further, my improved device is balanced at all times since the bearings are concentric, thus preventing vibration and excessive wear on the belt.

While I have shown the centering mechanism and links 57 for association with my improved apparatus it will be understood that this portion of my invention is in addition to the principal feature thereof. The principal feature consists of the main and auxiliary rollers in which the auxiliary rollers have greater resistance to rolling friction than do the main rollers, and the whole being supported for pivotal movement diagonally of the belt. The centering mechanism and links 57 for tying a number of the units together for mutual centering movement is desirable for use on belts which have an exaggerated tendency to run off-center. In practice I have found that the use of one of the units A, B or C alone, without the centering mechanism and links is sufficient in a large number of cases to maintain a belt centered.

While I have shown my invention in but two forms, it will be obvious to those skilled in the art that it is not so limited, but is susceptible of various other changes and modifications, without departing from the sipirit thereof, and I desire, therefore, that only such limitations shall be placed thereupon as are specifically set forth in the appended claims.

What I claim is:

1. In apparatus for supporting a conveyor belt at intervals along a length thereof, a plurality of sets of belt supporting idler rollers spaced from each other along the belt, each of said sets embodying at least one main belt supporting idler roller, the main roller of each set being progressively longer than the next rearward main roller when considering the direction of travel of the belt, a frame for rotatably supporting the main rollers of each set, means to mount the frames for pivotal movement diagonally of the longitudinal axis of the belt, and an auxiliary roller having greater resistance to rotation than the main roller mounted on the frame adjacent the ends of said main roller and on opposite sides of the pivot point of said frame, the auxiliary rollers of each set being progressively shorter than the next adjacent rearward roller when considering the direction of travel of the belt.

2. In apparatus for supporting a flight of conveyor belt, a main belt supporting roller, a frame in which the roller is mounted for rotation, means supporting the frame adjacent its longitudinal mid-point and permitting the same to pivot diagonally of the center line of the belt, an auxiliary belt supporting roller rotatably mounted on the frame at either side of the pivot point thereof closely adjacent the ends of the main roller and having greater resistance to rotation than the main roller, a cross member secured to the frame adjacent one end, a second cross member secured to the frame at a point nearer the end than the first cross member, a pair of arms having their inner ends pivotally connected to the ends of the first cross member, there being slots in the ends of the said second cross member, a pin on each arm slidable in the slot of the adjacent end of the second cross member, a pair of links pivotally mounted at their outer ends on fixed pivot points and with one edge of the inner ends thereof disposed to bear against the inner edges of the associated arm, a stop member on the ends of said second cross member disposed to engage the edges of the links opposite the edge thereof adjacent the arms, and a tension spring connecting the outer ends of the arms.

3. Apparatus as defined in claim 2 in which the inner ends of said links engage the edges of the arms at a point between the pivot points thereof and said pins.

OCIE RAWLINSON.

REFERENCES CITED

The following references are of record in the file of this patent:

UNITED STATES PATENTS

| Number | Name | Date |
| --- | --- | --- |
| 1,192,128 | Sibley | July 25, 1916 |
| 2,012,089 | Sayers | Aug. 20, 1935 |
| 2,451,594 | Klein | Oct. 12, 1948 |
| 2,561,641 | Thomson | July 24, 1951 |

FOREIGN PATENTS

| Number | Country | Date |
| --- | --- | --- |
| 28,756 | Great Britain | Of 1910 |